P. W. SHAW AND F. G. GALE.
TUBE WELDING MACHINE.
APPLICATION FILED MAY 5, 1922.
1,434,918.
Patented Nov. 7, 1922.
2 SHEETS—SHEET 2.
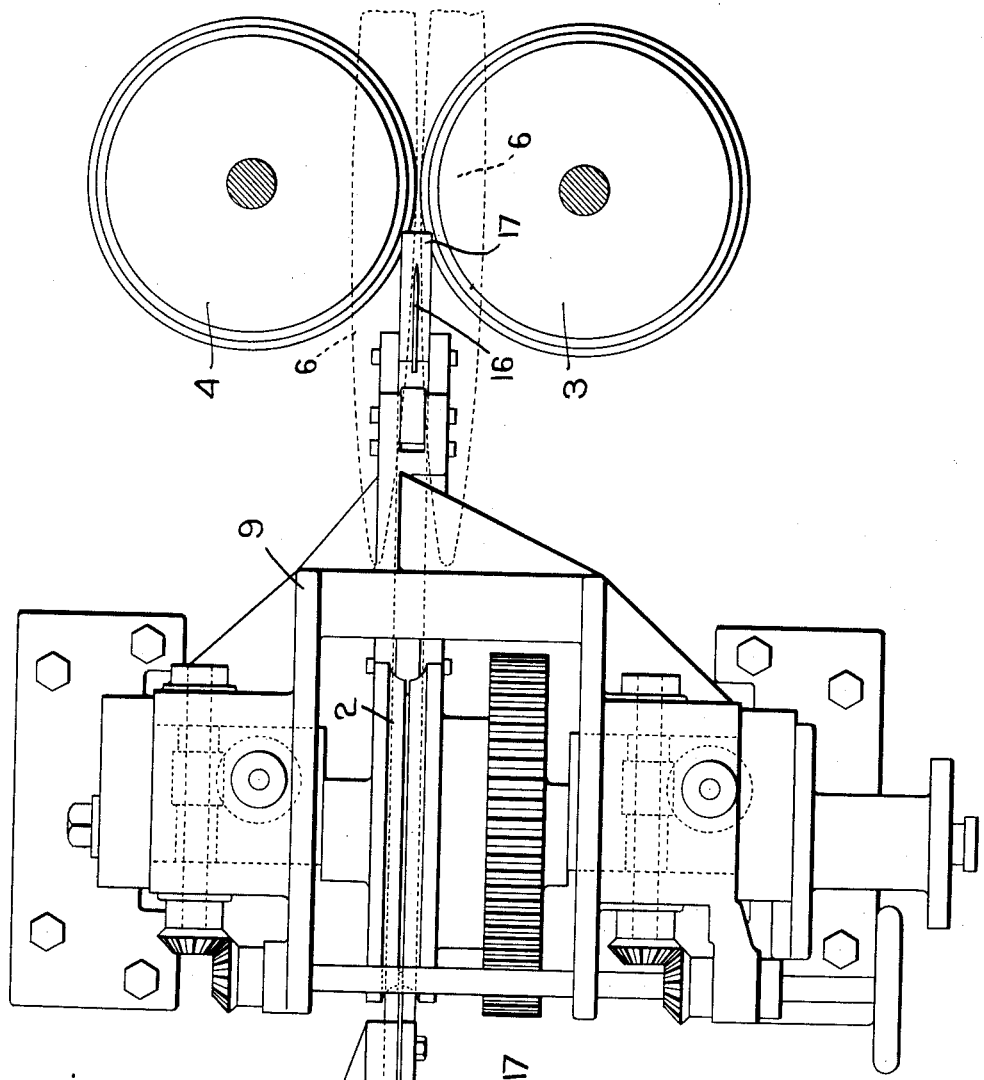
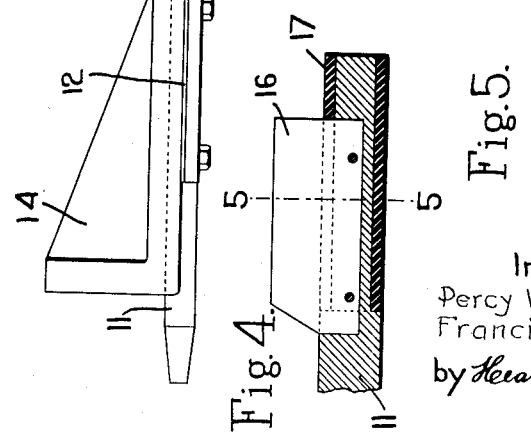
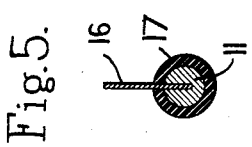
Inventor.
Percy W. Shaw &
Francis G. Gale.
by Heard Smith & Tennant.
Attys.

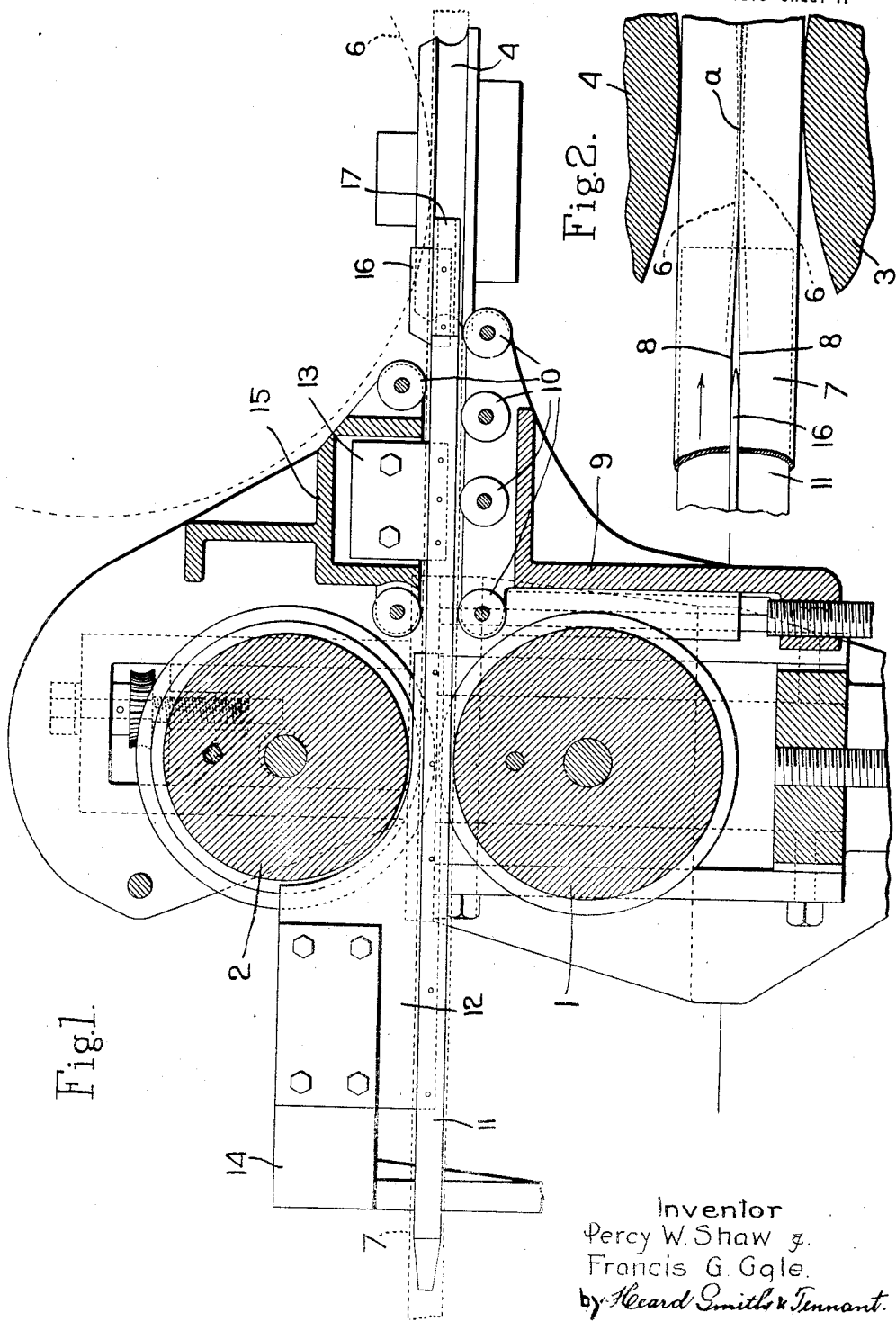

Patented Nov. 7, 1922.

1,434,918

UNITED STATES PATENT OFFICE.

PERCY W. SHAW, OF LYNN, MASSACHUSETTS, AND FRANCIS G. GALE, OF WATERVILLE, QUEBEC, CANADA; SAID SHAW ASSIGNOR TO SAID GALE.

TUBE-WELDING MACHINE.

Application filed May 5, 1922. Serial No. 558,717.

*To all whom it may concern:*

Be it known that we, PERCY W. SHAW, a citizen of the United States, and resident of Lynn, county of Essex, State of Massachusetts, and FRANCIS G. GALE, a subject of the King of Great Britain, residing at Waterville, Province of Quebec, Dominion of Canada, have invented an Improvement in Tube-Welding Machines, of which the following description, in connection with the accompanying drawing, is a specification, like characters on the drawing representing like parts.

This invention relates to tube welding machines and has for its object to provide an improvement in machines of this type by which both the accuracy and the speed with which the operation is performed can be increased. We accomplish this by a novel arrangement involving means for guiding the tube to be welded at a point closely adjacent to the welding point, our improved guiding means operating to hold the tube firmly in correct position so that the welding may be accurately performed.

In order to give an understanding of the invention we have illustrated in the drawings a selected embodiment thereof which will now be described after which the novel features will be pointed out in the appended claims.

Fig. 1 is a vertical sectional view through a portion of a tube welding machine embodying our invention.

Fig. 2 is an enlarged plan view showing the way in which the tube is guided closely adjacent the welding point.

Fig. 3 is a plan view of Fig. 2.

Fig. 4 is a sectional view through the end of the guiding mandrel.

Fig. 5 is a section on the line 5—5, Fig. 4.

Inasmuch as our present invention relates simply to the means for guiding the tube just as it passes to the welding contacts we have not thought it necessary to illustrate herein a complete tube welding machine but have contented ourselves with showing a sufficient portion of said machine only to enable the present invention to be understood.

The tube welding machine, a portion of which is herein illustrated, is of the known type having a pair of feed rolls for feeding a formed tube, a pair of presser rolls acting on the sides of the formed tube at substantially the welding point and operating to press the edges of the seam together, and contact rolls acting on the tube at opposite sides of the seam thereby to establish a welding current across the seam which performs the welding operation.

A machine having this construction is illustrated in the co-pending application of Gale and Shaw, Ser. No. 493,819, filed August 20, 1921.

In the drawings 1 and 2 indicate a pair of feed rolls by which the formed tube is fed to the contact rolls and 3 and 4 indicate a pair of push-up rolls or presser rolls adapted to act on the sides of the tube at the welding point and operating to close the seam of the tube. The contact rolls are indicated at 6 in dotted lines and they may have the construction similar to that illustrated in the above-mentioned co-pending application.

The feed rolls 1 and 2 are positively driven by suitable mechanism and the push-up rolls 3 and 4 may also be positively driven if desired, so that the tube will be fed forward by both the feed rolls and the presser rolls. The formed tube to be welded is indicated at 7 and it is fed into the machine with the seam to be welded on the upper side of the tube, and this seam will be open somewhat, that is the edges 8 thereof will be slightly separated, this being the natural shape which the formed tube assumes. As the formed tube is fed between the presser rolls, 3, 4 the edges 8 are forced together, as shown at the point $a$ in Fig. 2 and at this point the contact rolls 6 engage the two edges of the tube each side of the seam thus causing the flow of welding current across the seam which performs the welding operation all as usual in welding machines of this type. The contact rolls are indicated by the dotted lines 6 in Fig. 2.

The feed rolls 1 and 2 are shown as adjustably mounted in a suitable frame or support 9 and a plurality of guide rolls 10 are illustrated which engage the tube between the feed rolls and the presser rolls for assisting in maintaining the tube in proper position.

In the machine illustrated in said co-pending application the tube is fed into the machine over a mandrel which is provided with two fins, one on each side of the feed rolls, which fins occupy the open seam of the tube and serve to guide it. A similar mandrel is illustrated herein at 11 and said mandrel is provided with the fins 12 and 13 by which it is supported, the fin 12 being secured to a suitable support 14 and the fin 13 being secured to the portion 15 of the frame.

The parts thus far described are or may be all as shown in said co-pending application and form no part of the present invention.

In order to perform the welding operation properly it is essential that the tube should be held in correct position as it passes the welding contacts for if it twists one way or the other so that the seam does not pass between the contact rolls, the proper welding will not be produced. In order to thus properly guide the tube we propose to employ a construction which includes a guiding fin having its rear edge situated close enough to the welding point so as to obviate any danger that the tube will twist between the fin and the welding point, but which, however, is not sufficiently close to said welding point to short-circuit the current. In the present embodiment of our invention this is secured by extending the mandrel 11 nearly to the vertical plane of the axes of the presser rolls 3 and 4 and by providing said end of the mandrel with a guiding fin 16 which is situated closely adjacent the welding point. Since the fin 16 is suported by the mandrel which is situated within the tube it is possible to place it very close to the welding point without interfering in any way with the operation of the push-up rolls or the contact rolls.

The operaion of the guiding fin is illustrated well in Fig. 2. As the tube is fed along said guiding fin projects through the open seam and by the engagement of the edges 8 thereof it serves to hold the tube properly positioned, at a point just slightly in advance of the contact rolls. The action of the presser rolls 3 and 4 closes the edges 8 of the tube against each other, as shown at $a$, but because the fin 16 is situated closely adjacent the point where the presser rolls act on the tube there is no opportunity for the tube to twist or creep laterally between the fin and the presser rolls. As a result the portion of the tube passing the presser rolls will be always positioned with the seam correctly centered and positioned to pass between the two contact rolls 6.

We will preferably make the guiding fin 16 slightly thicker than the other fins so that as the tube passes the guiding fin the edges 8 will be spread slightly thus ensuring a contact of the fin with each edge and obviating any possibility of loose play laterally.

It will be noted that the end of the mandrel extends nearly to the welding point and in order to obviate the possibility of current passing from one contact roll to the other through the end of the mandrel rather than across the seam of the tube we propose to insulate the mandrel end. This is accomplished by providing the end of the mandrel with a sleeve 17 of insulating material.

While we have herein shown the mandrel as provided with two separate fins 12, 13 in addition to the guiding fin 16 yet so far as the invention is concerned the number of fins is not material, the important thing being that the mandrel is provided with a guiding fin which is situated as closely as possible to the welding point so that the tube will be guided correctly for the welding operation, without, however, having said fin so near the welding point as to short circuit the current.

We claim.

1. In a tube welding machine, the combination with a pair of contact rolls, of a pair of feed rolls situated in advance of the contact rolls, a pair of presser rolls engaging the tube at the welding point for closing the seam together, a guiding fin occupying the seam of the tube and situated closely adjacent the welding point and means within the tube for supporting the fin.

2. In a tube welding machine, the combination with a pair of contact rolls, of a pair of presser rolls, to act on the sides of the portion of the tube to be welded at the welding point, a mandrel over which the tube is fed, and a guiding fin extending from said mandrel through the open seam of the tube and situated at a point closely adjacent the presser rolls.

3. In a tube welding machine, the combination with a pair of contact rolls, of presser rolls to act on the sides of the tube at the welding point, a mandrel over which the tube is fed, a fin for supporting the mandrel extending through the open seam thereof, and a guiding fin extending from the mandrel through said seam and situated closely adjacent the presser rolls.

4. In a tube welding machine, the combination with a pair of contact rolls, of a pair of presser rolls to act on the sides of the tube as it passes under the contact rolls, a mandrel over which the tube is fed, the end of the mandrel extending to the contact rolls, a fin for supporting the mandrel and a guiding fin extending from the mandrel and situated adjacent the inner end thereof, both fins extending through the open seam of the tube, the inner end of the mandrel being insulated.

5. In a tube welding machine, the combination with a pair of contact rolls, of a pair of feed rolls situated in advance of the contact rolls, a pair of presser rolls engaging the tube at the welding point for closing the seam together, and a fin guiding the seam of the tube and having its rear edge situated as closely as posible to the welding point without short-circuiting the current.

6. In a tube welding machine, the combination with a pair of contact rolls of a pair of feed rolls situated in advance of the contact rolls, a pair of presser rolls engaging the tube at the welding point for closing the seam together, a mandrel over which the tube is fed, a fin secured to the mandrel and by which it is supported, said fin extending through the seam, and a guiding fin situated in front of the presser rolls but close to the same, said guiding fin being thicker than the supporting fin.

In testimony whereof we have signed our names to this specification.

PERCY W. SHAW.
FRANCIS G. GALE.